United States Patent [19]

Rivkin

[11] Patent Number: 5,969,264
[45] Date of Patent: Oct. 19, 1999

[54] METHOD AND APPARATUS FOR TOTAL AND INDIVIDUAL FLOW MEASUREMENT OF A SINGLE-OR MULTI-PHASE MEDIUM

[75] Inventor: Ilya Rivkin, Boston, Mass.

[73] Assignee: Technology Commercialization Corp., New York, N.Y.

[21] Appl. No.: 09/187,273

[22] Filed: Nov. 6, 1998

[51] Int. Cl.[6] .................................................. G01F 1/84
[52] U.S. Cl. .............................. 73/861.356; 73/861.04; 73/861.357
[58] Field of Search .................... 73/861.04, 861.356, 73/861.357

[56] References Cited

U.S. PATENT DOCUMENTS

| | | |
|---|---|---|
| 4,096,745 | 6/1978 | Rivkin . |
| 4,470,294 | 9/1984 | Hamel . |
| 4,655,089 | 4/1987 | Kappelt . |
| 4,729,243 | 3/1988 | Friedland . |
| 4,852,395 | 8/1989 | Kolpak . |
| 4,856,347 | 8/1989 | Johnson . |
| 4,949,583 | 8/1990 | Lang . |
| 5,024,104 | 6/1991 | Dames . |
| 5,029,482 | 7/1991 | Liu . |
| 5,044,207 | 9/1991 | Atkinson . |
| 5,048,349 | 9/1991 | Wolff . |
| 5,090,253 | 2/1992 | Kolpak . |
| 5,259,250 | 11/1993 | Kolpak . |
| 5,287,754 | 2/1994 | Kazakis . |
| 5,429,002 | 7/1995 | Colman . |
| 5,578,764 | 11/1996 | Yokoi . |
| 5,604,316 | 2/1997 | Alonso . |
| 5,654,502 | 8/1997 | Dutton . |

FOREIGN PATENT DOCUMENTS

| | | |
|---|---|---|
| 0424828 | 5/1991 | European Pat. Off. . |
| 0733886 | 9/1997 | European Pat. Off. . |
| 0803050 | 10/1997 | European Pat. Off. . |
| 0815415 | 1/1998 | European Pat. Off. . |
| 0816807 | 1/1998 | European Pat. Off. . |
| WO 9744640 | 11/1997 | WIPO . |
| WO 9807009 | 2/1998 | WIPO . |

*Primary Examiner*—Harshad Patel
*Attorney, Agent, or Firm*—Boris Leschinsky

[57] ABSTRACT

A method and apparatus for a total and individual flow measurement of a multi-phase gas/liquid medium with wide range of gas to liquid ratio provides high accuracy and tolerance of hydraulic and mechanical disturbances. The flow meter sensing element includes a hollow pendulum having two oscillators symmetrically positioned about its first portion and second portion. Non-fading oscillations of the pendulum provided by these oscillators are maintained constant at resonant frequency by the control unit by adjusting the amount of energy supplied to both oscillators regardless of the disturbances caused by Coriolis forces from the flowing medium. The total flow is computed based on the difference in the electrical energy supplied to both oscillators. Detection of the "zero drift" is based on the sum of electrical currents supplied to both oscillators. In one embodiment, the shape of the pendulum is straight. In another embodiments, a plurality of parallel pendulums are assembled together and in one plane to increase the flow capacity of the flow meter. In yet another embodiment, a pair of pendulums are forming a "tuning fork". The apparatus allows for accurate measurements of the total and individual flow rates of a multi-component medium such as gas-oil-water mixtures coming out of an oil well.

12 Claims, 6 Drawing Sheets

METHOD AND APPARATUS FOR TOTAL AND INDIVIDUAL FLOW MEASUREMENT OF A SINGLE-OR MULTI-PHASE MEDIUM

BACKGROUND OF THE INVENTION

1. Field of the Invention

The present invention relates generally to a method and apparatus for multi-phase fluid flow measurement based on the Coriolis principle. The apparatus according to the invention is particularly useful for gas-water-oil mixtures being produced from underground reservoirs and the like. Other areas of application for such a method and apparatus would include chemical, food processing, pharmaceutical, and other industries.

2. Description of the Prior Art

Efforts to measure the total mass flow as well as the flow rates of the components of the multi-phase fluid mixtures such as a gas-water-oil mixtures which are typically produced from oil and gas wells have resulted in the development of several types of flow measuring systems.

It is known to determine the mass flow rate of individual components of the multi-phase medium by method comprising preliminary separating a mixture into components and measuring the mass flow rate of each component separately, such as described in the U.S. Pat. No. 4,852,395 by Kolpak. This method is rather complicated and inaccurate since the accuracy of measurement depends on the quality of separation of the mixture. It is also known to measure the flow rate of individual components of two-component flows wherein volumetric and mass flow rates of a two-component flow are measured by using volumetric and mass flow rate sensors. Such sensors are mounted serially along the flow path. Signals proportional to the values of the measured flow rates are fed to a computer which solves a set of two equations with respect to variables representing volumetric and mass flow rates of individual components. In this case, the accuracy of measurements depends on fluctuations of the flow structure, variations of the pattern of velocity and pressure fields which are inevitable in different points of the pipeline. These devices have satisfactory performance as long as the gas/liquid ratio is not greater than 1:2. In practice, however, this ratio can go up to 25:1 or more.

In the past few years, a new type of flow meters had been under development based on the Coriolis principle. This type flow meter has the advantage of being simple and reliable and also lacks mechanical components influencing the structure of the measured flow. The accuracy of measurements does not depend for these devices on such physical characteristics of flow as viscosity, density, and temperature. The sensing element of such a flow meter is a hollow flow containing pendulum which is subjected to vibrations as the flow goes by. The Coriolis force is produced when the radius of the mass traveling in angular motion inside such pendulum is changed. The changing radius causes a corresponding change in angular acceleration which produces a net force tangent to the direction of rotation. The Coriolis force is effecting, depending on the way the hollow pendulum is fixed, the amount of energy losses in the vibrating system consisting of the pendulum itself and the measured flow.

There are two fundamental ways to fix the oscillating pendulum in place. In the first, cantilevered way, only one end of the oscillating pendulum is fixed in place while the other one is free to move. The flow rate is measured indirectly by the amount of additional energy necessary to compensate for the energy losses and maintain the oscillations at the same level. The second way is to fix both ends of the oscillating pendulum in place. In that case, the total energy loss of the whole system remains constant regardless of the form of the pendulum since the Coriolis forces on both sides of the pendulum work against each other. The flow information is derived from the changes in the vibration parameters and shape of the pendulum under the influence of Coriolis forces which tend to apply a "twisting" motion to the pendulum. These are the systems of direct measurement.

The flow meters based on the principle of direct measurement have been under development for the last few years. A wide variety of U-shaped and $\Omega$-shaped symmetric hollow oscillating pendulums are known to be developed by various companies working in this area. All of the known flow meters, however, have a similar drawback. Since the changes in the vibration parameters and pendulum shape under the influence of Coriolis forces are measured using the constant frequency other than the natural resonant frequency of the system, and since the Coriolis forces are naturally very small, while, at the same time, the stiffness of the hollow conduit is quite high, the absolute values of pendulum deviations are quite low and difficult to measure. Due to this factor, these devices work well with a single-phase flow, while in the case of a multi-phase flow the accuracy of the flow measurement is not acceptable due to the high level of hydrodynamic disturbances. Examples of such systems can be found in U.S. Pat. Nos. 5,429,002 by Colman; 5,287,754 by Kazakis; 5,044,207 by Atkinson, and 5,024,104 by Dames.

The U.S. Pat. No. 5,604,316 by Alonso describes a multiple phase Coriolis mass flow meter. The device includes a rotating member made up of a plurality of flow conduits arranged symmetrically around a shaft and driven by a motor. The conduits are attached on both ends to the shaft with one end closer to the shaft central line than the other end. The Coriolis force is imparted to the conduits while bending beam load cells are attached to measure the force. That device is rather complicated, requires a motor or an engine and an additional housing around the outlet of the conduits.

A gas/liquid flow measurement system using a Coriolis based flow meter is described in the U.S. Pat. No. 5,0290, 482 by Liu. The method according to the invention uses a Coriolis based mass flow meter. Flow streams of known mass flow rate and phase distribution are directed from the meter and correlation factors are obtained using an apparent mass flow rate output and an apparent density output from the Coriolis meter. The true mass flow rate and phase distribution of unknown flow streams can then be determined. The limitation of this device is that it works well only in high gas/liquid ratio flows such as a wet stream.

A flow-meter for determining a flow rate of liquid or slurry flowing in the pipeline is described in the U.S. Pat. No. 4,856,347 by Johnson. The meter includes a tube-like J-bend member which is connected to the pipeline by a non-restricting, ring-type universal joint. Although useful for a multi-phase flow measurements, this device comprises an open-ended conduit, which makes it practical only in specific applications.

Another Coriolis type fluid flow meter and a multi-phase fluid flow measurement system is described in the U.S. Pat. Nos. 5,090,253 and 5,259,250 by Kolpak. A complicated measurement system includes a volumetric meter such as a Coriolis flow meter, a densimeter, and another meter which measures the fraction of one liquid in the two liquid mixture. A Coriolis type flow meter has separate bundles of tubes which are interconnected with each other to vibrate laterally with respect to the direction of flow through the tubes by vibrating mechanism and which vibrations are sensed by spaced apart sensor devices for determining the vibrational characteristics and related mass flow rate and mass density of fluid flowing through the tube bundles. In one embodiment, the inlet and the outlet manifold are arranged for parallel lateral flow of fluid to and from the manifolds and the respective sets of flow tubes are spaced apart along the manifolds and arranged in alternating sets interconnected by tie rods at the respective vibrator mechanisms and sensors. As noted in the description of the invention, this device works satisfactorily only if the gas to liquid ratio is not more than about 1:5 given that the diameter of the flow conduit is about ¼ of an inch. In reality, this ratio may be much higher and therefore, this device has limited utility. Another problem is that the arrangement of parallel conduits is done in such a way that the stiffness of the overall device is very high. This affects the accuracy of the measurements in a negative way by further reducing the absolute values of the oscillations to be measured.

A two-phase Coriolis flow meter is described in my U.S. Pat. No. 4,096,745 which is incorporated herein by reference. Although a cantilevered design is described with only one end of the oscillating pendulum fixed in place, this patent contains a description of several important principles for the design of the Coriolis based multi-phase flow meters which are important to keep in mind designing any type of such a system. Here is a brief summary of these principles:

The natural frequency of oscillations of the pendulum filled with the medium should be at least ten times smaller then the fundamental frequency of the medium itself which can be closely approximated to be equal to the ratio of the speed of sound travelling in the medium over the size of the pendulum in the plane of its oscillations (pendulum diameter in case of a round shape). This relationship may also be represented by the following formula:

$$f\delta \leq 30,$$

where f—is the frequency of pendulum oscillations measured in 1/c, and δ—is the size of the pendulum in the plane of oscillations measured in cm. For a round pendulum it is the inside diameter of the pendulum. In that case, the oscillations amplitude of the pendulum would not depend in any appreciable way on the changes in energy losses introduced by the flowing medium and so the error of flow measurements as was determined by us experimentally would not exceed about 5% for the multi-phase medium and respectively 0.2% for the single-phase medium. These low levels of measurement error are practically acceptable by the industry;

The pendulum diameter should be designed in such a way that the minimum speed of the flowing gas/liquid medium is sufficiently high, and hence, the Froud number is sufficiently high as well to maintain a type of a multi-phase flow known as a self-similar flow. In that case, the ratio of flowing gas speed to the flowing liquid speed is constant and the relationship between the actual volumetric gas content and the flow rate gas content is linear. It was demonstrated empirically that in case of ascending and horizontal flows, the value of the Froud number should be higher than 4 in order to satisfy this requirement. In case of descending flow conditions and depending on the nature of the gas/liquid flow, self-similar flow conditions occur at higher Froud numbers;

Integration time for calculating the flow parameters should be chosen in such a way that even under the highly unstable high gas/liquid ratio flow conditions, the accuracy of measurements should not fall below the required minimum. Highly unstable flow conditions occur when large quantities of gas coalesce together to form a large bubble or "plug" along the flow pathway and a plurality of these bubbles of various sizes flow in the liquid medium. As can be appreciated by those skilled in the art, such bubbles represent a major disruptions in the continuity of flow. Should the integration time be chosen small, under these conditions the accuracy of flow measurements would be significantly decreased. It was empirically determined that a 100 second integration time interval would yield a fairly high accuracy of not worse then 1.5% under any flow conditions including those described above. To get an even higher accuracy of, for example, not worse then 0.5%, a 1000 second integration time interval is required which is still not unreasonable for a typical oil well. In addition, an optional flow conditioner may be employed prior to the entrance to said device to more evenly mix the flow and allow for increased accuracy of flow measurement, especially those flows experiencing large gas bubbles or plugs.

At the same time, a cantilevered type design described in my above referenced patent, has the following limitations typical for all flow meters of that type:

In case of high absolute flows and low gas/liquid ratios, a zone of low pressure may form inside the device housing which may cause periodic interruptions in the flow measurements;

In case of descending flows, the self-similar flow conditions require the Froud number to be greater then 50 which, in turn, cause the pressure drops across the oscillating pendulum to be quite high as well. This limits the utility of the flow meters for some specific liquids;

The open ended pendulum causes additional disturbances in the flow conditions which reduce the accuracy of flow measurements; and finally Design of the flow meter capable of working with high pressure drop across the pendulum demands the use of heavy metallic components which makes the device heavy and more costly.

Therefore, the basic technical controversy is as follows: it is desirable to switch from a cantilevered type flow meter with energy loss compensation method of measurement to the one in which both ends of the oscillating pendulum are fixed. However, direct measurement method typically used for these preferred type flow meters does not yield sufficiently high measurement accuracy in case of a multi-phase flow conditions. The need therefore exists for a Coriolis based flow meter where both ends of the pendulum are fixed in place which is capable of accurate and reliable measurements of individual multi-phase flow components, such as gas and liquids with a wide range of gas/liquid ratios.

SUMMARY OF THE INVENTION

Accordingly, it is an object of the present invention to overcome these and other drawbacks of the prior art by providing a novel method and apparatus for accurate mass and flow measurements of a multi-phase flow medium and its components based on the Coriolis principle and containing an oscillating pendulum fixed in place at both ends.

It is another object of the present invention to provide a method for verification of the "zero" reading (detection of the "zero drift") for such a flow meter without interrupting the flow of the measured multi-phase medium.

It is a further object of the present invention to provide a flow meter with increased range of measurements without increasing its physical size.

According to the method of the invention, a multi-phase flow of the gas/liquid medium is pumped through a hollow pendulum made in a straight shape or that of a loop with both the inlet and the outlet of the pendulum being fixed in place. The loop is shaped to have a first and a second half so that these halves are symmetrical. The axis of symmetry of the pendulum is going through the midpoint between the fixed ends of the loop and perpendicular to the line between said ends. The pendulum is equipped with at least two electromagnetic oscillators placed symmetrically on each of both halves of the loop. A system of weights can be optionally placed on the pendulum to bring its natural frequency in line with the requirement described above when filled with the medium. Electrical energy is supplied to each oscillator to initiate at natural frequency and maintain on the same level the oscillations and the speed of the pendulum motion in the direction lateral to the direction of the flow. Fluid medium flowing through the pendulum would cause Coriolis forces to disturb the oscillations of the pendulum. To compensate for this disturbance, a different amount of energy is supplied to individual oscillators to preserve the same nature of pendulum oscillations. The total mass flow rate of the medium is calculated based on the difference in electrical energy supplied to individual oscillators. The density of the medium is calculated as being proportional to the initially measured difference between the natural frequency of the hollow pendulum itself and the natural frequency of the pendulum filled with the measured medium. Outlet pressure is also measured and based on the empirically derived nomograms, and based on all the parameters known from the above described measurements, individual component flow parameters are calculated for the multi-phase medium.

Another useful technique is to measure the sum of electrical currents supplied to the oscillators while maintaining the same speed of pendulum oscillations. This sum does not depend on the mass flow rate through the pendulum and allows for verification of the "zero" reading of the apparatus without interrupting the flow of the measured medium. In case of a "zero drift", correction factors may be computed based on this parameter.

In order to increase the range of measured flow without increasing appreciably the size and weight of the device, it is suggested to utilize more than one loop in parallel so that more flow can pass by the apparatus but individual pendulum diameter is still small enough for higher flow speeds. In that case however, all such loops should be placed in the same plane so that the stiffness of such plurality of loops is not increased significantly. Alternately, two loops may be assembled together based on a "tuning fork" principle.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE FIRST PREFERRED EMBODIMENT OF THE INVENTION

A detailed description of the present invention follows with reference to accompanying drawings in which like elements are indicated by like reference numerals.

Figures 1A, 1B:
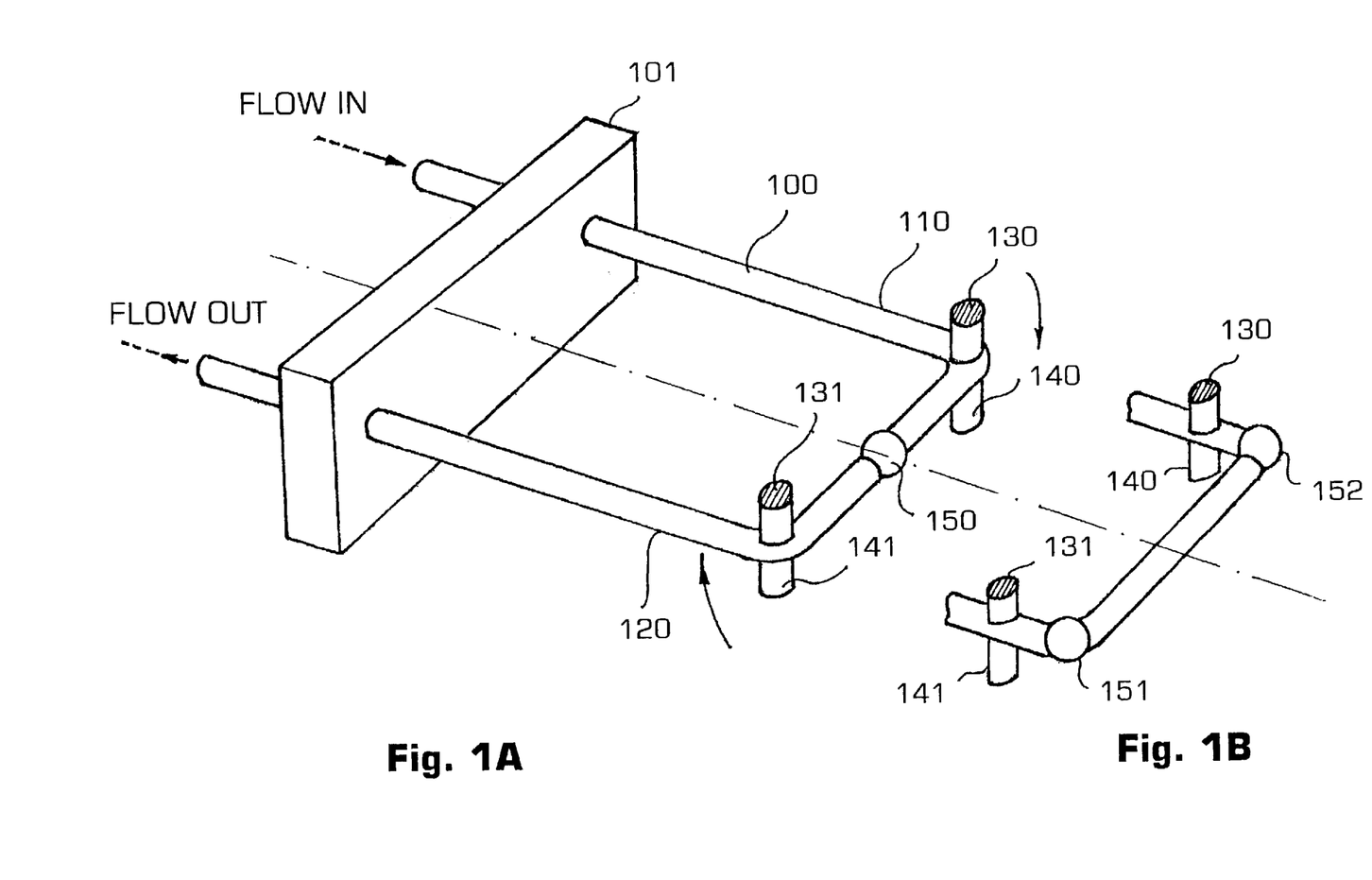
FIG. 1A is a schematic view of the basic version of the apparatus according to the first embodiment of the invention with a single pendulum weight located on its axis of symmetry.
FIG. 1B is the same view but with two weights symmetrically located on a pendulum.

FIG. 1A illustrates the main sensing element of the apparatus according to the method of the invention, namely the U-shaped oscillating pendulum (100) with both inlet and outlet ends permanently fixed in place in a base plate (101). The U-shaped design is only one of many possible shapes of the pendulum as long as they are symmetrical about the main axis of symmetry of the pendulum which is a line going through its midpoint and perpendicular to the line connecting the inlet and the outlet. It is used here because it is convenient for the purposes of explaining how the apparatus should be structured. The U-shaped loop of the pendulum has a first portion (110) extending from the inlet to the midpoint and a second portion (120) extending from the midpoint to the outlet of the pendulum (100). At least two oscillating means are positioned about the pendulum (100) in such a way that the first oscillating means causes oscillations of the first portion of the pendulum and the second oscillating means causes oscillations of the second portion of the pendulum respectively. In this case, the first oscillating means consists of an electromagnetic loop comprising two electromagnets (130) and (140) positioned about the pendulum (100) in symmetry with respect to the direction of flow. The second oscillating means consists respectively of electromagnets (131) and (141) positioned about the second portion of the pendulum. The first oscillating means is positioned symmetrically to the second oscillating means with respect to the main axis of symmetry of the pendulum. A central weight (150) is placed on the pendulum axis of symmetry and determines the natural frequency of the pendulum oscillations. A variation of this design is shown on FIG. 1B where there are two weights (151) and (152) positioned symmetrically on the pendulum (100). Other configuration of weights is possible based on the individual shapes of pendulums as long as it has a cumulative center of gravity located on the pendulum axis of symmetry so as not to disturb the balance of the pendulum oscillations.

Figure 1C:
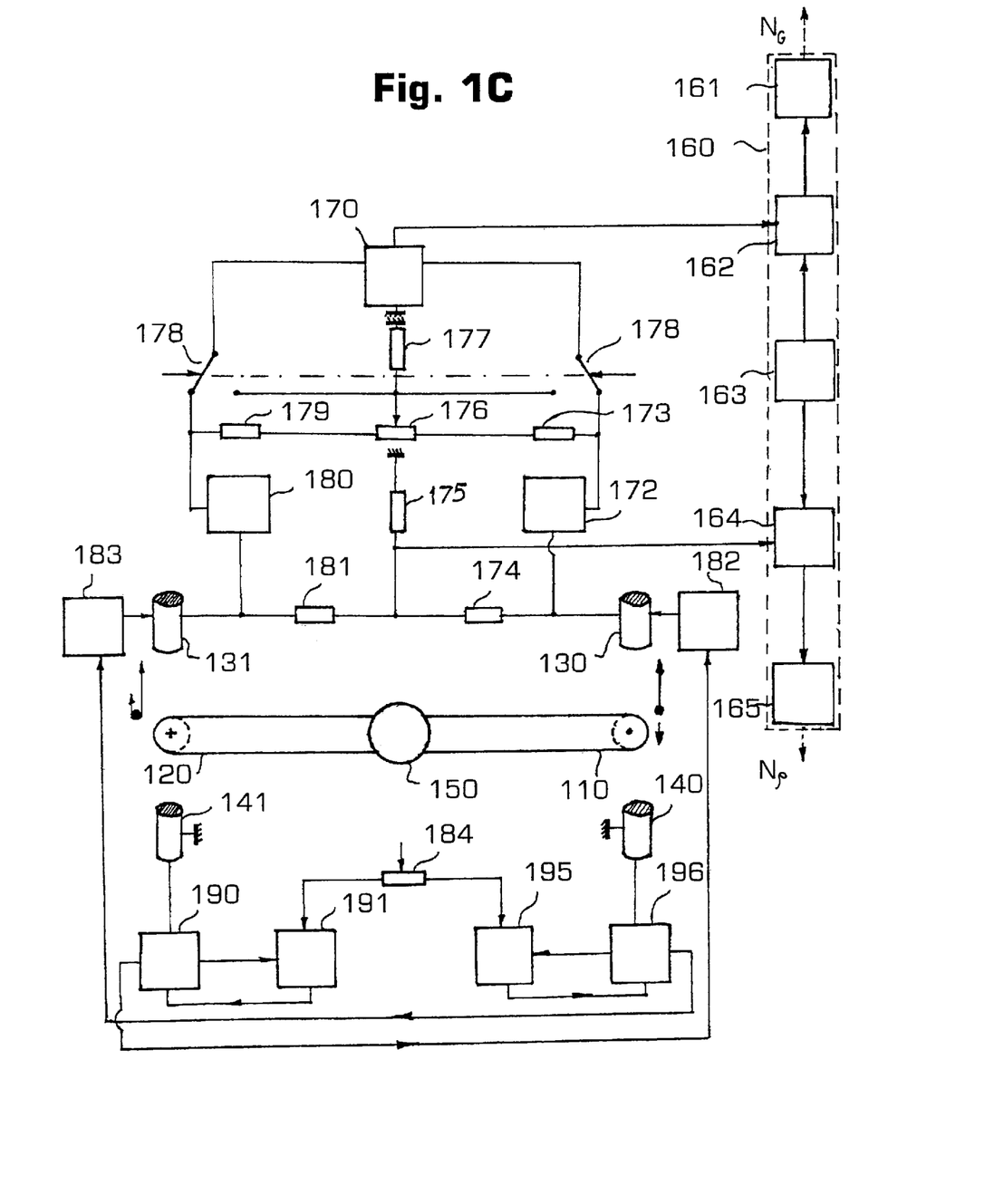
FIG. 1C is a block-diagram of the control and computation unit for the flow meter in accordance with the invention.

FIG. 1C illustrates a block-diagram of the control unit for the flow meter including a computational block (160). Pendulum (100) is located in the middle of the magnetic field of electromagnets (130), (131), their respective amplifiers (182) and (183), and electromagnets (140) and (141) with their respective adjustable voltage amplifiers (196) and (190) forming two closed electromechanical loops together with the pendulum (100). Amplifiers (196) and (190) are controlled by known in the art corresponding blocks of automatic gain adjustment (195) and (191). Given the positive feed back in these electromechanical loops, non-fading oscillations are initiated in these loops. Assuming that the electric and mechanical amplification factors are equal in both loops, the section of the pendulum between the oscillators would oscillate and move parallel to itself under the conditions of no flow.

Moving fluid medium would cause Coriolis forces to disturb these oscillations in the following way: in the inlet part (110) of the pendulum the oscillations would tend to be damped and fade away while in the outlet part (120) the opposite would be true—the oscillations would tend to increase in force and magnitude. In other words, Coriolis forces would create a certain "twisting" force causing the pendulum to twist in the clockwise direction of the arrows on FIG. 1A in addition to its parallel oscillations. The amplitude of these twisting motions is what is measured in the flow meters of the prior art to determine the flow rate of the system. As was noted before, the absolute values of these motions are so small (in some cases measured in microns) that it is difficult to measure it directly with high precision.

According to the method of the invention, the very tendency of the pendulum to start the "twisting" motion is precluded by automatic continuous adjustments of the oscillators and the difference in energy supplied to both oscillators is used to determine the flow rate. In particular, the difference in electrical currents supplied to the amplifiers (182) and (183) is used to compute the mass flow rate through the pendulum (100).

It is important to use the adjustable voltage amplifiers (190) and (196) with steep and linear dependence of their output gain factors from the voltage supplied by the respective blocks of automatic gain adjustment (191) and (195). Gain adjustment blocks (191) and (195) are in turn controlled by the voltage supplied from the input block (184). As long as the voltage from the amplifier (190) is less than the input voltage from the block (184), the gain factor of the block (191) is maximum. If the reverse is true, the gain factor is reduced. Accordingly, the electrical current on the output of the amplifier (182) is also reduced. The same principle is realized for the other half of the control system consisting of blocks (195), (196), and (183). The result of their operation is maintaining constant the amplitude of pendulum (100) oscillations.

This apparatus is extremely sensitive and accurate in operation. Our tests indicate that changing the medium flow rate from zero to maximum causes the amplifier (182) or (183) electric current to increase about 10 times while the voltage across electromagnets (140) and (141) remains about the same. Because of that, this electric current would be proportional to the flow rate through the pendulum and can be used to compute mass flow rates.

As discussed earlier, the flow meter control unit comprises two individual control loops: one to control the speed of oscillations of the first part (110) of the pendulum (100) and the other to individually control the same for the second part (120) of the pendulum (100). Flowing through the flow meter medium causes Coriolis forces to turn the pendulum clockwise around its axis of symmetry. These forces would reduce the total pull force from the electromagnet (130) while they would increase the total pull force from the electromagnet (131). This forces the pendulum to move away from the electromagnet (141) and closer to the electromagnet (140). The voltage signal across respective electromagnets (140) and (141) causes the increase of electrical current supplied to the amplifier (182) and decrease of the same for the amplifier (183). That is how the system compensates for the presence of Coriolis forces. It should be noted that the flow meter would work just as well if the direction of flow is reversed.

Data collection is organized in the following way. Flow information is determined from electrical currents through the amplifiers (182) and (183) which are also going through the resistors (174), (175), and (181). Voltages across resistors (174) and (181) would be proportional to the currents and would allow for computing of mass flow rates. These voltages are modified by DC converters (172) and (180) as well as resistors (173), (176), and (179) and fed through button (178) to the voltage-to-frequency converter (170). The output frequency signal is fed from the converter (170) to the dividing frequency counter (162) of the computing block (160). Any change in frequency values fed from the converter (170) would indicate a certain change in flow through the flow meter. A timer (163) is designed to "open" the counter (162) for a certain predetermined period of time, for example 100, 1000 or 10000 seconds. This time interval is important since it determines the accuracy of the measurements as was discussed above. The signal is fed from the dividing frequency counter (162) to the accumulating frequency counter (161) only during the "open" period of time allowed by the timer (163). Accumulating counter (161) computes the average flow rate through the flow meter over the time interval allowed by the timer (163) and outputs this information in any desirable way. Adjustments of the "zero" and "gain" factors of the converter (170) allows to change the output units of the counter (161) to any meaningful flow measurement units, say barrels per day.

The sum of currents of the amplifiers (182) and (183) is going through the resistor (175) and remains constant. The frequency signal is derived from this resistor and fed to another dividing frequency counter (164) of the computing block (160). This frequency signal consists of two components: the natural frequency of the pendulum and the additional frequency which depends on the density of the flowing medium. Similar signal conditioning by the dividing (164) and accumulating (165) frequency converters lead to extraction of another important parameter of the flowing medium, namely its density.

By removing the timer (163) from operation, one can use the apparatus as a continuous mass flow meter for a gas/liquid flow.

Activation of the button (178) connects a constant voltage from the resistor (177) [which is proportional to the sum of electrical currents through amplifiers (182) and (183)] to the converter (170). Since this voltage is constant, the output frequency of the converter (170) determines the "zero flow" conditions. Thus, without flow interruptions, one can easily check the zero drift and compute correction factors to the flow meter output readings should it be necessary.

Flow parameters may be computed based on the following equations:

$$G_m = K_1(N_G - N_{GO}), \text{ where} \quad [1]$$

$G_m$ is the mass flow rate of the medium, $N_G$ is the output from counter (161), $N_{GO}$ is the same output in no flow conditions, and $K_1$ is the proportionality factor;

$$\rho_m = K_2[(N_0/N_m)^2 - 1], \text{ where} \quad [2]$$

$\rho_m$ is the density of the medium, $N_0$ is the reading of the counter (165) while the pendulum (100) is empty, $N_m$ is the same during normal flow conditions, and $K_2$ is another proportionality factor.

In case of small deviations of the frequency signals of less then 5% (which is still quite practical), one can assume that $$\rho_m/\rho_{mo} \approx \Delta N_m/\Delta N_{mo}, \text{ where} \quad [3]$$

$\rho_m$ is the density of flowing medium; $\rho_{mo}$ is the density of medium filled pendulum but without any flow; $\Delta N_m$ is the difference in counter (165) readings when the pendulum is empty and when the medium is flowing by; $\Delta N_{mo}$ is the difference in same counter (165) readings when the pendulum is empty and when it is filled with the medium but without any flow.

It is known from the laws of hydrodynamics that $$\rho_m/\rho_{mo} = 1-(1-\rho_g/\rho_{mo})\phi, \text{ or alternately}$$

$$\phi = [1-\rho_m/\rho_{mo}]/[1-\rho_g/\rho_{mo}], \text{ where} \quad [4]$$

$\rho_g$ is the gas density at pressure P; $\phi = S/A$—volumetric true gas content in a gas/liquid medium; S—cumulative cross-sectional area of the pendulum filled with gas fraction at pressure P which is a dimensionless value numerically equivalent to absolute pressure, and A—simple geometrical cross-sectional area of the pendulum.

On the other hand, the volumetric gas flow rate $\beta$ at a given pressure P is calculated as $$\beta = Q_g/Q_m = Q_g/(Q_{mo}+Q_g) = \alpha_{mo}/(1-\alpha_{mo}), \text{ where} \quad [5]$$

$$\alpha_{mo} = Q_g/Q_{mo} = \beta(1-\beta), \text{ being a so-called "gas number"}, \quad [6]$$

$Q_g$ is a volumetric flow rate of a gas phase at a given pressure P, $Q_{mo}$ is a volumetric flow rate of liquid phase, and $Q_m$ is a volumetric flow rate of the total medium.

Volumetric and true gas flow rates are interdependent as follows:

$$\beta = V_g/V_m \phi, \text{ where} \quad [7]$$

$V_g$ and $V_m$ are respectively the flow speeds of gas and the total medium. Under the conditions of the self-similar flow, this relationship is linear and can be assumed to be as follows: $\beta = 0.81 \phi$.

Above equations can be used for computing the individual flow rates of a two-phase, two component medium such as gas/oil. Since $G_m = G_g + G_{mo}$, $G_g = Q_g \rho_g$, and $G_{mo} = Q_{mo} \rho_{mo}$, one can calculate the mass flow rate of the liquid phase:

$$G_{mo} = G_m/(1+\rho_g \alpha_{mo}/\rho_{mo}) \quad [8]$$

and the volumetric flow rate of gas phase:

$$Q_g = Q_{mo} \alpha_{mo} = G_{mo} \alpha_{mo}/\rho_{mo} \quad [9]$$

The details of computing the individual flow rates for a three component medium such as oil-water-gas are specifically described in my previously mentioned U.S. Pat. No. 4,096,745.

Detailed Description of the Second Embodiment of the Invention

Figure 2:
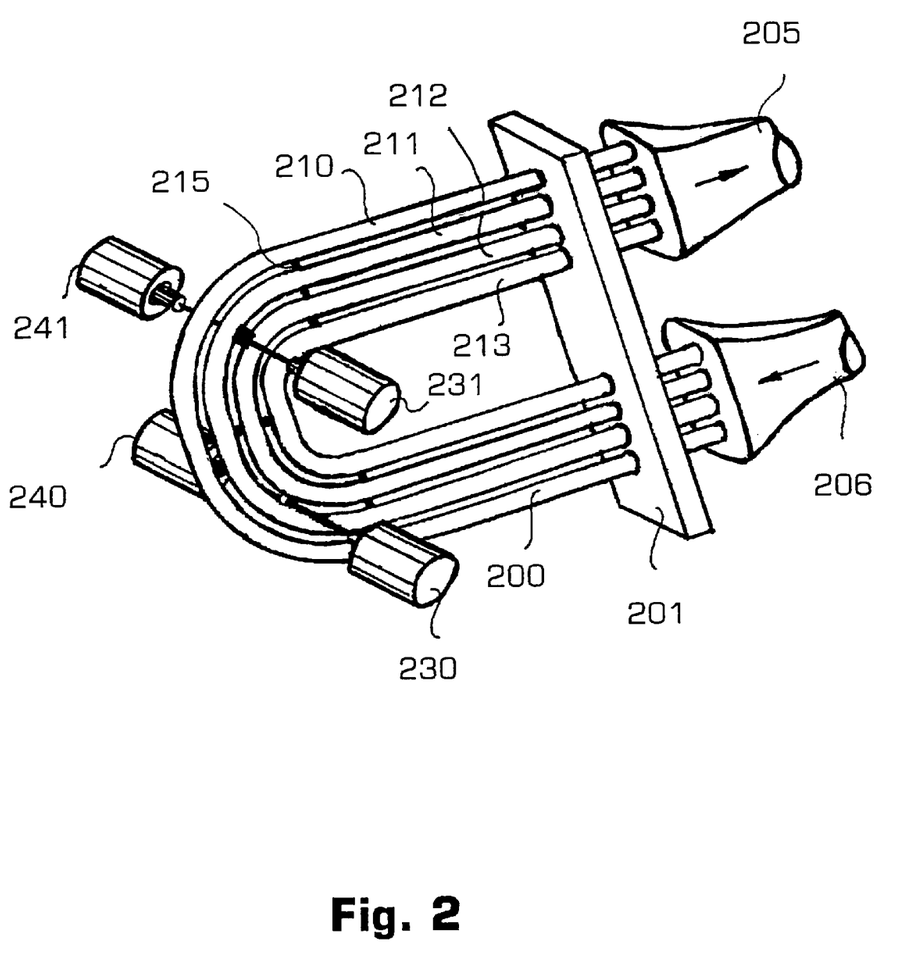
FIG. 2 is a general view of the sensing element of the second embodiment of the present invention.

FIG. 2 illustrates the second embodiment of the present invention in which the measurement range of the flow meter is increased by having a plurality of individual pendulums (200) containing the flow of the measured medium to oscillate as one unit.

The incoming flow is divided in the manifold (206) into a plurality of flows and each individual flow is directed towards an individual pendulum (210) through (213) (four are shown on the drawing although more or less pendulums may be used). Individual flows are collected back together at the outlet manifold (205). All pendulums are fixed together in the base plate (201) and attached to each other via tie rods (215). Together they form a symmetrical loop similar to the one described in the first embodiment. The important feature of this arrangement is that individual pendulums are preferably located in the same plane so that the total stiffness of the oscillating system is minimized. Electromagnets (230) and (231) as well as (240) and (241) are positioned in a similar manner to that of the first embodiment of the instant invention.

In operation, the medium is flowing through the individual pendulums and measurements are taken using the same main principles as described above. The presence of the plurality of pendulum conduits allows to maintain the necessary flow speeds but increase the total cross-sectional area of the flow meter and thus increase the measurement range of the apparatus without appreciable increase in its size and weight.

Detailed Description of the Third Embodiment of the Invention

Figures 3, 4:
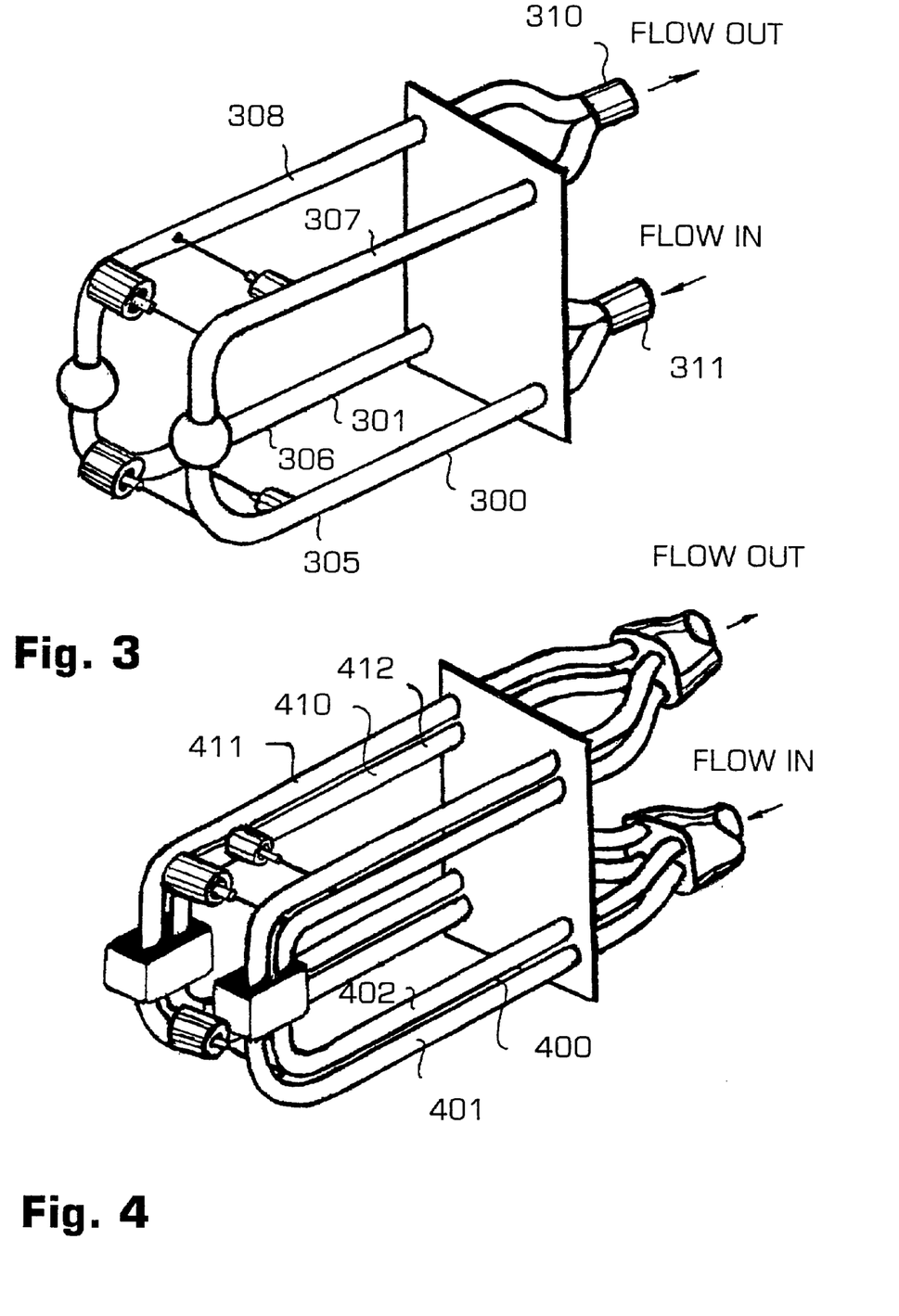
FIG. 3 is a general view of the sensing element of the third embodiment of the present invention.
FIG. 4 is a general view of the sensing element of the fourth embodiment of the present invention.

The third embodiment of the present invention is illustrated on FIG. 3 where at least two pendulums (300) and (301) are assembled on the inlet (311) and outlet manifolds (310) forming a shape generally known as a "tuning fork". Here, section (305) of the first pendulum forms a "tuning fork" together with the section (306) of the second pendulum and the input manifold (311). Similarly, section (307) of the first pendulum forms a "tuning fork" together with the section (308) of the second pendulum and the output manifold (310). Other elements of the design are similar to the previously described.

Detailed Description of the Fourth Embodiment of the Invention

A combination of the principles behind the second and third embodiments yields a fourth embodiment of the present invention wherein a "tuning fork" type flow meter contains pendulum branches so that each branch consists in turn of a plurality of individual pendulums. FIG. 4 shows an example of such an apparatus with two pendulum branches (400) and (410) where each branch consists of two individual pendulums (401), (402) located in the same plane for branch 400 and, respectively (411) and (412) for branch 410.

Flow meters of this type have some important advantages that make them attractive in practical use:

They allow a "mix-and-match" type assembly where a wide range of flow meters for a variety of flow conditions may be assembled with a limited number of parts;

They are less sensitive to various mechanical noises and hydrodynamic disturbances.

Detailed Description of the Fifth Embodiment of the Invention

Figure 5:
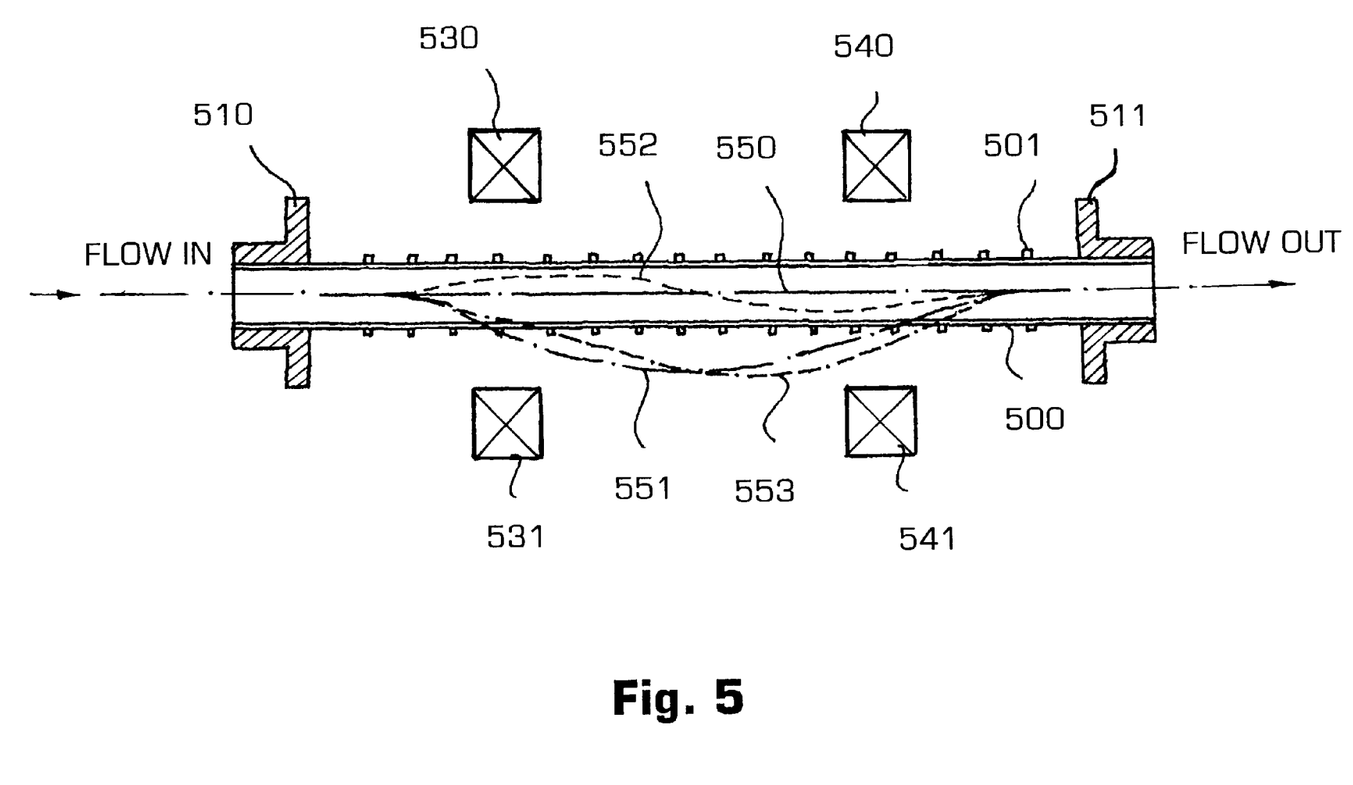
FIG. 5 is a schematic view of the fifth embodiment of the present invention where the pendulum has a straight shape.

In some cases, in particular in narrow oil wells, it is necessary to minimize the dimensions of the flow-meter. In these cases, flow meters with a straight rather than a loop shape may have a particular advantage. FIG. 5 illustrates schematically a straight shape pendulum of the flow meter constituting the fifth embodiment of the present invention. The pendulum (500) connects the inlet (510) and the outlet (511) to allow the medium to flow in a straight way. In order to increase the amplitude of oscillations, it is suggested to make the pendulum with a thin wall and at the same time to provide radial stiffness ribs (501) to maintain the same pressure rating of the flow meter. The first oscillation means comprises a pair of electromagnets (530) and (531). The second oscillation means is positioned in symmetry to the first oscillation means about the midpoint of the pendulum and comprises a pair of electromagnets (540) and (541). The principal operation of this embodiment is similar to the previous embodiments of this invention. Under no flow conditions the central line (550) is bending down to become the line (551) when the oscillating means are activated. Flowing medium causes Coriolis forces to bend that line into the line (552) which, when combined with oscillations, forms the final line (553). A control system described earlier prevents that phenomenon. The flow parameters are calculated based on this compensatory effect.

Figure 6:
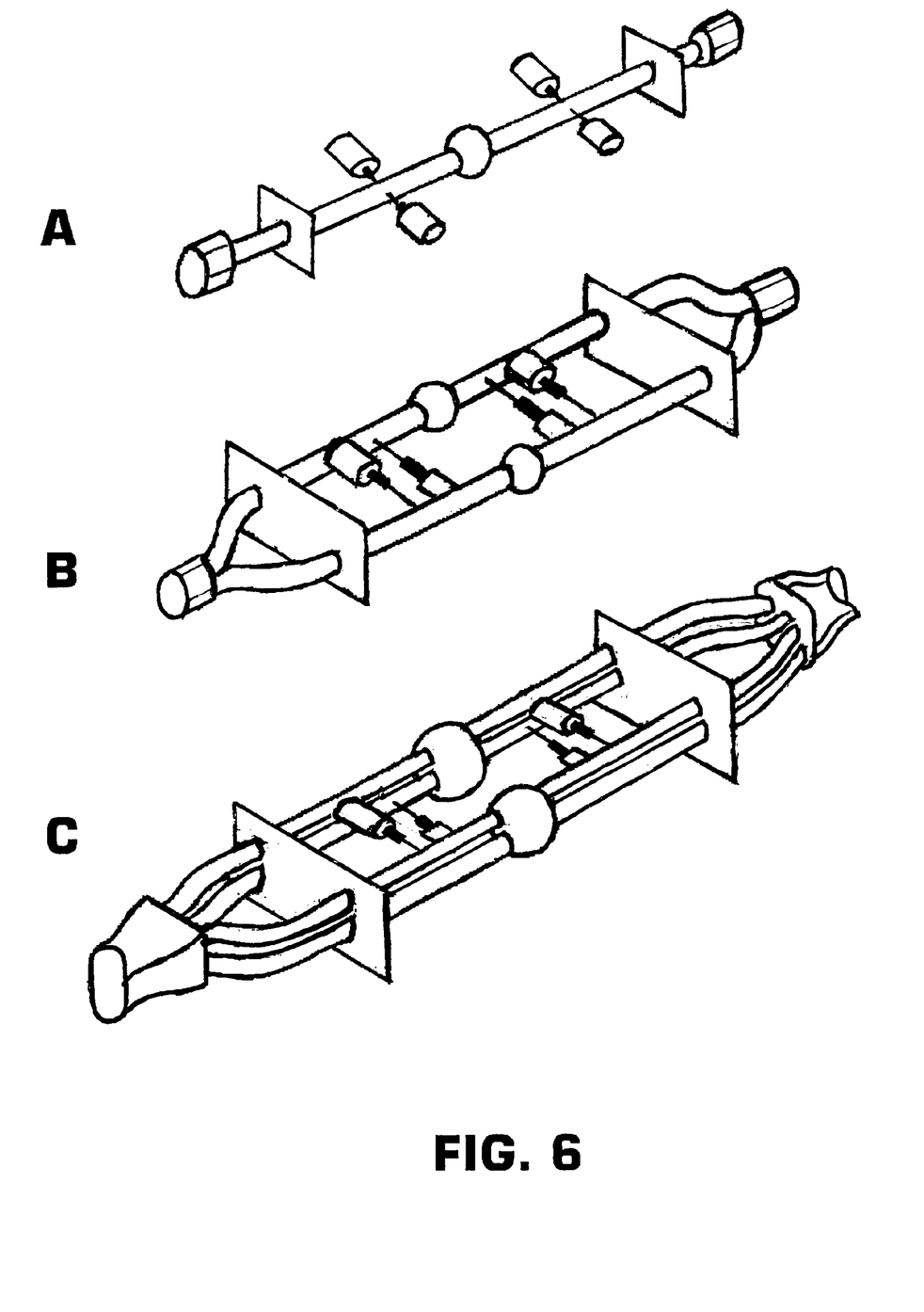
FIGS. 6A, 6B, and 6C are general views of additional variations of the fifth embodiment of the present invention.

FIG. 6 illustrates variations of the fifth embodiment of the present invention. FIG. 6A shows a simple straight flow meter design. FIG. 6B shows two straight pendulums arranged as a "tuning fork". Finally, FIG. 6C shows a combination of a "tuning fork" arrangement with a multi-loop pendulums principle discussed earlier.

Although the present invention has been described with respect to several specific embodiments and applications, it is not limited thereto. Numerous variations and modifications readily will be appreciated by those skilled in the art and are intended to be included within the scope of the present invention, which is recited in the following claims.

What I claim is:

1. An apparatus for a total and individual flow measurement of a multi-phase gas/liquid medium, said apparatus comprising:

a hollow pendulum having an inlet, a midpoint, and an outlet, the inlet and the outlet being fixed in place, said pendulum having a first portion between the inlet and the midpoint and a second portion between the midpoint and the outlet, said portions being symmetrical about a line forming an axis of symmetry of said pendulum, said line going through said midpoint and a midway point between the inlet and the outlet of said pendulum;

a first pair of electromagnets and a second pair of electromagnets for causing non-fading oscillations of said pendulum, said medium flowing through said pendulum from the inlet to the outlet causing Coriolis forces to disturb said oscillations, said first pair of electromagnets positioned about the first portion of said pendulum, said second pair of electromagnets respectively positioned about the second portion of said pendulum, said first and second pairs of electromagnets positioned symmetrically about the axis of symmetry of said pendulum, said first pair of electromagnets having a first electromagnet and a second electromagnet positioned opposite said first electromagnet about said pendulum and forming a closed electromechanical loop with said first portion, said second pair of electromagnets having respectively a third electromagnet and a fourth electromagnet positioned opposite said third electromagnet about said pendulum and forming a closed electromechanical loop with said second portion; and a control unit for said first and second pairs of electromagnets, said unit individually adjusting electrical currents supplied to said first and second pairs of electromagnets to compensate for oscillation disturbances caused by said Coriolis forces, said unit computing the total flow of the medium through said pendulum and the flow rates of all components of the medium based on the difference in electrical currents supplied to said first and second pairs of electromagnets and the change in frequency of said pendulum oscillations caused by the flowing medium.

2. A flow meter as in claim 1 further comprising a weight positioned at said midpoint of said pendulum on said axis of symmetry.

3. A flow meter as in claim 1 further comprising a plurality of weights positioned on said pendulum, said weights having their cumulative center of gravity positioned on the axis of symmetry of said pendulum.

4. A flow meter as in claim 1, wherein said pendulum having a shape of a straight line from said inlet to said outlet.

5. A flow meter as in claim 1 or claim 4, wherein said pendulum further comprising a plurality of individual pendulums for increased flow capacity, said individual pendulums being parallel to each other, said pendulums being positioned in the same plane, said plane being perpendicular to the direction of oscillations, said pendulums being fixedly attached to each other and oscillating as a single unit.

6. A flow meter as in claim 1, wherein said pendulum comprising a first pendulum and a second pendulum, each of said first and second pendulums further comprising a plurality of individual pendulums for increased flow capacity, said individual pendulums being parallel to each other, said pendulums being positioned in the same plane, said plane being perpendicular to the direction of oscillations, said pendulums being fixedly attached to each other and oscillating as a single unit.

7. A method for a total and individual flow measurement of a multi-phase gas/liquid medium, said method comprising the steps of:

feeding the gas/liquid medium through a hollow pendulum having an inlet, a midpoint, and an outlet, the inlet and the outlet being fixed in place, said pendulum having a first portion between the inlet and the midpoint and a second portion between the midpoint and the outlet, said portions being symmetrical about a line forming all axis of symmetry of said pendulum, said line going through said midpoint and a midway point between the inlet and the outlet of said pendulum;

imparting non-fading oscillations to said pendulum using a first pair of electromagnets and a second pair of electromagnets while said medium flowing through said pendulum from the inlet to the outlet causing Coriolis forces to disturb said oscillations, said first pair of electromagnets positioned about the first portion of said pendulum, said second pair of electromagnets respectively positioned about the second portion of said pendulum, said first and second pairs of electromagnets positioned symmetrically about the axis of symmetry of said pendulum, said first pair of electromagnets having a first electromagnet and a second electromagnet positioned opposite said first electromagnet about said pendulum and forming a closed electromechanical loop with said first portion, said second pair of electromagnets having respectively a third electromagnet and a fourth electromagnet positioned opposite said third electromagnet about said pendulum and forming a closed electromechanical loop with said second portion, individually adjusting electrical currents supplied to said first and second pairs of electromagnets to compensate for oscillation disturbances caused by said Coriolis forces, computing the total flow of the medium through said pendulum based oil the difference in electrical currents supplied to said first and second pairs of electromagnets, and computing the flow rates of individual components of said medium based on the change in frequency of said pendulum oscillations caused by the flowing medium.

8. A method as in claim 7, wherein said pendulum further comprising a plurality of individual pendulums for increased flow capacity, said individual pendulums being parallel to each other, said pendulums being positioned in the same plane, said plane being perpendicular to the direction of oscillations, said pendulums being fixedly attached to each other and oscillating as a single unit.

9. A method as in claim 7, wherein said pendulum further comprising a weight positioned at said midpoint of said pendulum on said axis of symmetry.

10. A method as in claim 7, wherein said pendulum having a shape of a straight line from said inlet to said outlet.

11. A method as in claim 7, wherein the step of computing the flow rates of individual components of said medium further comprising the step of determining the density of said medium based on the change in frequency of said pendulum oscillations caused by the flowing medium, and further computing the individual component flow rates based on predetermined nomograms within a predetermined period of time.

12. A method as in claim 7 further comprising a step of detection and computing the correction factors for a "zero drift" based on a sum of electrical currents supplied to said pairs of electromagnets.

* * * * *